United States Patent [19]

Paulin

[11] Patent Number: 5,015,515
[45] Date of Patent: May 14, 1991

[54] VENTILATED EXPANDABLE BOOT

[76] Inventor: Dale W. Paulin, 1146 State Route 60, Ashland, Ohio 44805

[21] Appl. No.: 781,127

[22] Filed: Sep. 26, 1985

Related U.S. Application Data

[63] Continuation of Ser. No. 633,952, Jul. 24, 1984, abandoned.

[51] Int. Cl.$^5$ .................................................. B32B 3/26
[52] U.S. Cl. ..................................... 428/36.8; 92/34; 138/121; 428/36.9
[58] Field of Search .................. 138/121, 118, 119; 74/566, 608; 428/36, 36.8, 36.9; 92/34–47, 104

[56] References Cited

U.S. PATENT DOCUMENTS

| | | | |
|---|---|---|---|
| 2,143,960 | 1/1939 | Stalter | 138/118 |
| 3,314,430 | 4/1967 | Alley et al. | 138/118 |
| 3,369,411 | 2/1968 | Hines | 92/34 |
| 3,878,685 | 4/1975 | Schmunk | 138/121 |
| 3,967,023 | 6/1976 | Lysek | 428/122 |
| 4,003,408 | 1/1977 | Turner | 138/118 |
| 4,058,018 | 11/1977 | Lauper | 92/35 |
| 4,113,818 | 9/1978 | Drossbach | 138/121 |
| 4,168,799 | 9/1979 | Turner | 138/118 |
| 4,396,574 | 8/1983 | Kovacs | 264/533 |
| 4,446,948 | 5/1984 | Melinat | 188/73.34 |
| 4,515,842 | 5/1985 | Kovacs | 138/121 |
| 4,629,641 | 12/1986 | Paullin | 138/121 |

Primary Examiner—James J. Seidleck
Attorney, Agent, or Firm—Renner, Otto, Boisselle & Sklar

[57] ABSTRACT

An expandable boot employing a bellows for enclosing and protecting an object that changes in dimension. In one embodiment, the boot includes a vent in the form of at least one tube projecting from the boot and open to the atmosphere for the admission or expulsion of air as the bellows is extended or contracted. Preferably, a second tube similar to the first and projecting from the opposite end of the boot permits passage of air through the boot when it is stationary to prevent excess moisture accumulation. The bellows is protected against kinking during its compression by providing that adjacent webs in the pleats of the bellows are asymmetrical.

10 Claims, 1 Drawing Sheet

VENTILATED EXPANDABLE BOOT

CROSS REFERENCE TO RELATED APPLICATION

This is a continuation of application Ser. No. 633,952, filed July 24, 1984 now abandoned the benefit of whose filing date is hereby claimed.

BACKGROUND

Rubber boots for the protection of objects from the environment are known. It is also known to prepare elastomeric boots having bellows that fit over objects or mechanical joints that bend or extend and contract. The bellows permits the motion without destruction of the boot.

When boots are used over objects kept outdoors there is a tendency for condensation to form inside them which may be damaging to the protected parts. In addition, when such boots are extended or compressed by movement of the objects in them, the boots may be bulged or collapsed if air cannot be exchanged rapidly enough with the atmosphere.

During compression, bellows type boots may kink and the resulting bunching can interfere with the desired mechanical movement of the object within the boot. All the foregoing problems have been observed in boots used to protect the drive mechanisms that are used to aim reflector antennas used to receive satellite signals.

SUMMARY OF THE INVENTION

The problems of moisture collection, influx and efflux of air and kinking observed in using bellows type boots are solved in the invention. In the invention, a boot is made of an elastomer, such as neoprene. A bellows having a series of pleats is prepared by coating a mandrel with liquid elastomer, and curing and stripping the coating from the mandrel. The mandrel provides not only for the forming of the usual pleats between the ends of a bellows, but provides for a vent. In one form, the vent is a tube projecting from one end of the bellows. The tube allows air to be drawn to the boot when it is extended and to be expelled when the boot is compressed. The tube is formed by attaching a rod to the mandrel and cutting the end off the projection that is formed over the rod by the elastomer coating. Preferably the rod terminates in a pinched end so that the open exposed end of the tube is a slit. A slit excludes rain, etc. from the bellows but permits sufficient air flow in and out of the bellows. Preferably, tube type vents are formed at both ends of the bellows to permit air to flow through the bellows while it is stationary so that excess moisture is swept out.

Each end of the bellows terminates in a wall including a hole formed to slip over the object being protected when the boot is installed. A flange projecting from the hole lies tangentially to the protected object and may be clamped to the object to make a tight seal.

The kinking problem is solved by making the pleats, i.e. the bellows folds and adjoining webs, asymmetrical. Every second web is made wider than its neighbors. The wider web bulges slightly making it convex and its neighbors concave. When the bellows is compressed, the concave webs nest briskly into the convex webs to form a neat package. This structure is not susceptible to kinking.

A mandrel for making the inventive boot appears to be a series of frustums joined together, large base to large base and small base to small base. A mandrel for preparing a boot including the assymetrical pleats would bear the shape of frustums prepared from similar conical solids, but having two different vertex angles so that their respective small and large bases have the same area.

DETAIL DESCRIPTION OF PREFERRED EMBODIMENTS

Figure 1:
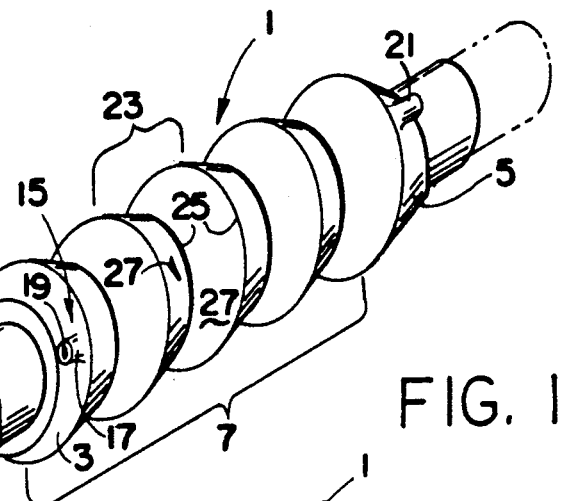
FIG. 1 is a perspective view of an embodiment of a boot according to the invention.

A perspective view of an embodiment of a boot 1 according to the invention is shown in FIG. 1. Boot 1 has opposing ends 3 and 5. Between them extends a bellows 7 for increasing or reducing the distance between ends 3 and 5 by the extension, compression or bending of bellows 7. End 3 includes a hole 8 from the periphery of which an outwardly projecting flange 9 extends. Flange 9 is dimensioned to fit snugly and tangentially about an arm 11 (shown in broken lines) of an object (not shown) that boot 1 is intended to enclose and protect. The object is enclosed inside boot 1 when the boot is in use and another arm may project from a hole in end 5 of boot 1 with another flange engaging that arm. A clamp 13 holds flange 9 tightly against arm 11 to make a good seal. Boot 1 is installed by slipping the object to be protected through hole 8. Preferably the boot is fabricated of an elastic material that may be stretched as necessary to insert the object.

It is preferred that ends 3 and 5 and bellows 7 be of unitary construction. Typically, the boot is made from an elastomer, such as neoprene as is explained hereinafter. The objects enclosed and protected by the tubular bellows part of the boot might be a telescoping drive unit for aiming an antenna reflector that has arms extending from both ends of the boot. When the drive unit is actuated, bellows 7 is extended or contracted. Flange 9 is but one sort of attachment means for sealing the boot to projecting arms of the object within the boot. The clamp shown is an electrical cable tie that includes a ratchet to prevent it from loosening. A conventional hose clamp or other suitable clamping means could be used as well to seal the boot.

Figure 2:
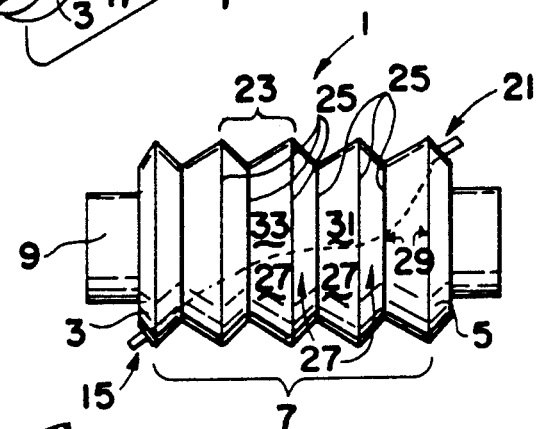
FIG. 2 is a schematic cross sectional view of an embodiment of a boot according to the invention showing an air flow path through the boot.

A vent 15 projects from end 3. The vent has a tubular portion 17 terminating in a slit 19. Vent 15 provides communication between the atmosphere and the inside of boot 1. When bellows 7 is stretched or compressed, vent 15 allows air to enter or exit boot 1 to avoid collapse or ballooning of the boot. Preferably, a second vent 21 projects from end 5, as best seen in FIG. 2. These two vents not only prevent collapse and ballooning, but also allow air to circulate through boot 1, as indicated by the path shown in broken lines, while the boot is stationary. The air circulation prevents undesired moisture collection in the boot resulting from condensation. A larger opening than slit 19 could be provided on the vent. However, a slit is preferred to exclude rain and the like from the interior of the boot. The slit must be stable enough not to collapse on itself and block the vent when air is flowing in. In a less preferred embodiment of the invention, holes may be punched in the bellows to permit air flow; however, these holes are difficult to punch and readily permit rain and other undesired matter to enter the boot.

Figure 3A:
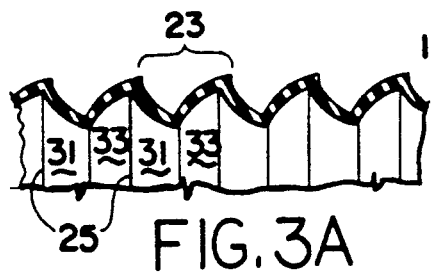
FIG. 3A is a cross sectional view of a portion of an embodiment of a boot according to the invention showing extended pleats.
Figure 3B:
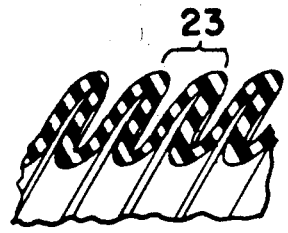
FIG. 3B is a cross sectional view of a portion of an embodiment of a boot according to the invention showing compressed pleats.

Bellows 7 comprises a plurality of pleats 23, some of which are shown in FIGS. 3A and 3B. Those pleats include alternatingly opposed folds 25. That is, each fold flexes in the direction opposite from that of its nearest neighbors. Folds 25 form closed geometrical figures that are disposed circumferentially and transversely to arm 11. In the depicted embodiment, those folds are circular, but they may be any other closed curved or polygonal figure. Folds 25 define the limits of annular webs 27 that span the folds. Each web 27 has a minimum dimension or width 29 measured between the adjacent folds that define the web.

Boot 1 might balloon or collapse if it were not vented. That result could interfere with the changes in dimension of the object in the boot, for example, caused by actuation of the drive mechanism that is part of the object. Likewise, if the pleats of the boot kink or bunch upon compression or bending of bellows 7, then movement of the enclosed object could be restricted. Pleats 23 are constructed to avoid kinking when bellows 7 is compressed.

As best seen in the FIGS. 3A and 3B, partial cross sectional views of the boot, a means to avoid kinking is provided by making adjacent webs of different widths. In the depicted embodiment, two different web widths are used alternatingly, but a larger number of different web widths could be used to produce the same function. As shown in FIG. 3A, the cross section of the narrower web 31 is generally planar, but the wider web 33 has a non-planar, slightly convex shape when bellows 7 is stretched. When bellows 7 is compressed, web 31, because of its narrower width, snaps into a concave shape received by web 33 to assume the position of FIG. 3B. This snap-action nesting assures that the pleats stack as desired when bellows 7 is compressed so that no kinking occurs. In the embodiment shown, all the pleats have the same outside and inside fold diameters, but the invention is not so limited. Depending upon the shape of the object to be enclosed, the pleat folds may not be circular nor need their dimensions be constant between the ends of the boot.

Figure 4:
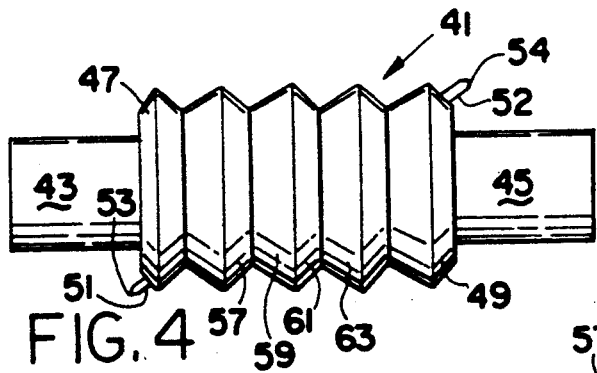
FIG. 4 is a side view of a mandrel for preparing an embodiment of a boot according to the invention.
Figure 5:
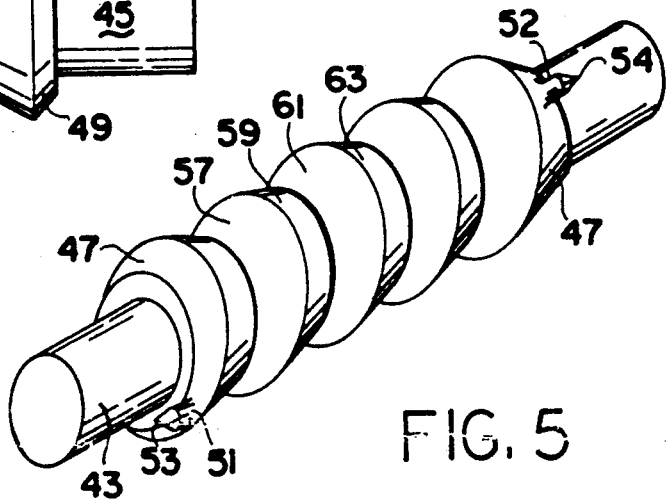
FIG. 5 is a perspective view of a mandrel for preparing an embodiment of a boot according to the invention.

The boot embodiment illustrated is simply made from an appropriate mandrel such as is shown in FIGS. 4 and 5. The mandrel is dimensioned to be slightly longer than the fully extended length of the boot made from it to compensate for the resiliency of the material from which the boot is made. Mandrel 41 may be formed from wood or metal and includes arms 43 and 45 projecting from its ends 47 and 49, respectively. Rods 51 and 52 terminating in pinched ends 53 and 54, respectively, project from ends 47 and 49, respectively, for forming vents.

Mandrel 41 contains a center portion including a plurality of similar sections. The shape of that central portion is the same as would be formed if a number of frustums of conical solids were joined. Frustums have two substantially parallel bases, one having larger area than the other. The shape formed here is as if those frustums were joined large base to large base and small base to small base to form the pleating portion of the mandrel.

The frustums could all be identical. However, the illustrated mandrel provides for forming asymmetrical pleats comprising a means for avoiding kinking of the bellows. Referring to FIG. 4, a typical section of mandrel 41 includes four frustum shapes 57, 59, 61 and 63. Frustums 57 and 61 are identical in the embodiment shown as are frustums 59 and 63. As explained before, the frustums are joined large base to large base and small base to small base. As is clear from the figure, all small bases and large bases are of the same respective areas to avoid discontinuities at the pleat fold lines. This matching requirement combined with the asymmetrical pleating requirement, means that the vertex angles of the conical solids from which the alternating sets of frustums (e.g. 57 and 61, 59 and 63) are prepared must differ. As earlier noted, the conical solids from which the frustums are theoretically cut need not be circular cones and a plurality of frustum sizes may be used to make the outside dimension of the bellows vary along its length.

Once an appropriate mandrel, such as 41 is prepared, it is coated with a liquid elastomer, such as by dipping in neoprene. The coating is cured and stripped off the mandrel. Some trimming may be required to permit stripping off the mandrel and, of course, the ends of the coating formed over rods 51 and 52 is trimmed off to open the vent tubes. As seen in FIG. 5, those rods have converging or pinched ends 53 and 54 to aid in formation of the desired slit opening.

The invention has been described with respect to certain preferred embodiments. Those skilled in the art will recognize various modifications and additions within the spirit of the invention. Accordingly, the scope of the invention is limited solely by the following claims.

I claim:

1. An elastomeric boot for protecting an object from environmental influences, said boot comprising:
   a flexible tubular enclosure having opposite ends and having an interior for containing an object with variable dimensions and for protecting said object from environmental influences external to said enclosure;
   tubular attachment means connected with each of said ends for securing said enclosure to said object;
   expansion means from and between said ends for varying the distance between said ends in response to changes in the dimensions of said object; and
   vent means for allowing the influx of ambient air into said enclosure or efflux of interior art from said enclosure in response to an air pressure differential between the air inside and outside the enclosure,
   said vent means having at least two openings through said enclosure positioned to enable air to circulate through the enclosure substantially the entire length thereof.

2. The invention of claim 1 wherein said attachment means comprises a flange means extending from a said end for circumferentially engaging said object.

3. The invention of claim 2 further including clamp means for clamping said flange to said object.

4. The invention of claim 1 wherein said expansion means comprises a bellows including a plurality of pleats having alternatingly opposed folds defining the boundaries of and joined by annular webs, each fold forming a closed geometric figure circumferentially and transversely disposed with respect to the variable dimension of said object.

5. The invention of claim 4 wherein said bellows includes anti-kinking means for preventing kinking of said pleats when said bellows is compressed.

6. The invention of claim 5, each web having a width equal to the minimum distance between the folds defining it, wherein said anti-kinking means comprises adjacent webs having different widths.

7. The invention of claim 6 wherein every second web has a first width and all other webs have a second width that is different from said first width.

8. The boot of claim 1 wherein said tubular attachment means and said air exchange means comprise the only openings in said boot.

9. The boot of claim 8 wherein said boot is of unitary construction.

10. The elastomeric boot of claim 1 wherein said two openings of said vent means are positioned generally at opposite ends of said enclosure.

* * * * *